United States Patent [19]
Query

[11] 3,937,402
[45] Feb. 10, 1976

[54] FLUID DISTRIBUTION SYSTEM

[76] Inventor: Grady W. Query, 3534 Central Ave., Charlotte, N.C. 28205

[22] Filed: Mar. 27, 1974

[21] Appl. No.: 455,079

Related U.S. Application Data

[63] Continuation-in-part of Ser. No. 373,879, June 26, 1973, abandoned.

[52] U.S. Cl.................................. 239/70; 239/207
[51] Int. Cl.². ........................................ B05B 12/02
[58] Field of Search ....... 239/70, 67, 207, 209, 266, 239/337; 169/16; 43/124, 132 A; 21/77; 222/70

[56] References Cited
UNITED STATES PATENTS

| | | | |
|---|---|---|---|
| 2,630,347 | 3/1953 | Petery et al............................ | 222/70 |
| 3,016,956 | 1/1962 | Olandt................................ | 169/16 X |
| 3,039,536 | 6/1962 | Moore et al. ........................ | 169/37 |
| 3,464,591 | 9/1969 | Nicola................................ | 222/70 |

*Primary Examiner*—John J. Love
*Attorney, Agent, or Firm*—Larry Harold Kline

[57] ABSTRACT

A fluid distribution system including a main conduit and one or more branch conduits communicating therewith, each of the branch conduits having at least one normally closed nozzle with a solenoid actuated valve, the solenoids being connected by means of a circuit through condition responsive means such as a timer to an associated source of electrical power together with an aerosol container containing a first pressurized fluid and connected to the main conduit so that the conduits are filled with the first pressurized fluid under equilibrium conditions with the container contents whereby periodic actuation of the solenoids is obtained through the timer for opening all of the nozzles simultaneously to spray areas adjacent the nozzles with a quantity of the first pressurized fluid and a supplementary source of a second pressurized fluid being provided connected by conduit means to the aerosol container which is introduced into the aerosol container to compensate for pressure loss in the first pressurized fluid in the conduits.

11 Claims, 3 Drawing Figures

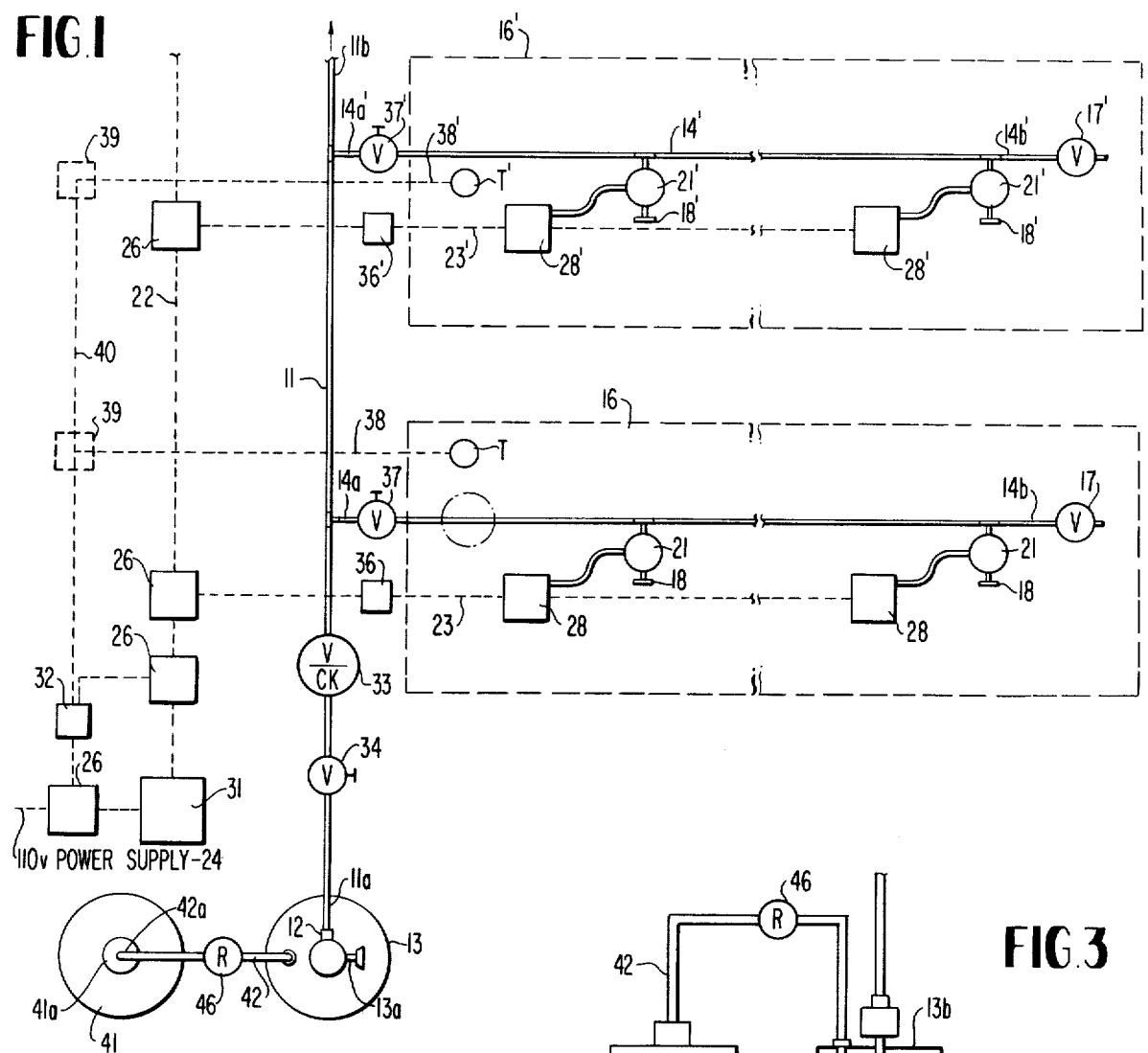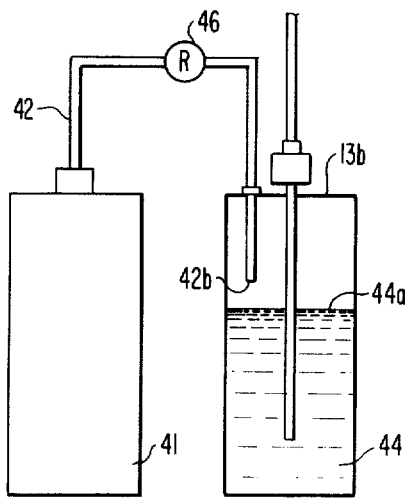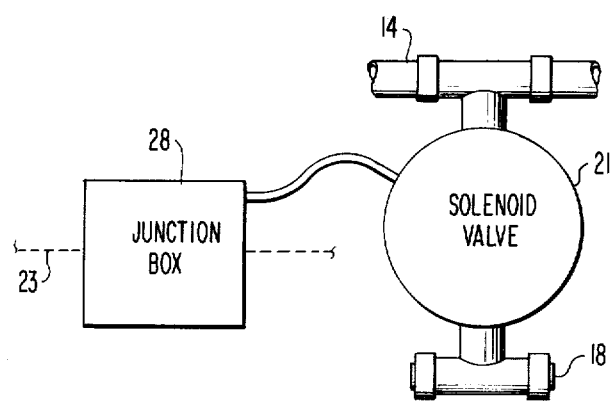

FLUID DISTRIBUTION SYSTEM

This application is a continuation-in-part of the application entitled INSECTICIDE SPRAY SYSTEM, Ser. No. 373,879, filed by the applicant herein on June 26, 1973 now abandoned.

FIELD OF THE INVENTION

This invention relates to spray systems and more particularly to such a system for periodically spraying specific quantities of pressurized fluid throughout an area.

DESCRIPTION OF THE PRIOR ART

It has been proposed in the past to utilize a permanently installed system of conduits such as pipes or the like having nozzles connected thereto for spraying areas with a suitable fluid such as a disinfectant, a deodorant, an insecticide or the like. While some degree of success has been obtained with such prior art systems, they have not only been expensive to install and maintain but accurate control of the quantity of material sprayed to the desired degree has not been obtained with resultant waste and/or the spraying of inadequate quantities of material. Furthermore, the construction of some prior art systems has resulted in a failure to adequately cover the area with the sprayed material.

One type of such present day spray system has been utilized to spray insecticide in areas such as dairy barns, food processing plants and the like for extermination of insects of the type which are a source of contamination, annoyance disease, etc. While such insecticides are generally effective in insect extermination, there is always the problem of spraying a precise amount of insecticide within critical limits so that no more or less of insecticide is sprayed then necessary. As has been recognized, less than the desired amount of insecticide results in inadequate extermination and an excess of insecticide results in contamination of the area or of the goods sprayed.

It has also been proposed in the past to utilize insecticide containers containing a measured volume of insecticide, the containers being emptied during each spray cycle and replaced after the spraying operation. It has even been proposed to utilize containers of the aerosol type containing a single dosage of insecticide packaged in the well known insecticide-gaseous propellant mixture so that evacuation of the mixture in the aerosol container provides the desired measured volume to be sprayed through the nozzles in the distribution system. An example of such a system is shown in U.S. Pat. No. 3,614,841 entitled EXTERMINATION METHOD issued on Oct. 26, 1971 to the applicant herein.

In such prior insecticide distribution systems where specific dosages of insecticide must be dispensed periodically, the requirement for dispensing a precise amount of insecticide has presented a number of limitations. For instance, to provide a measured volume of insecticide during each spraying operation, the container must be replaced or refilled during each operation. In addition, subsequent to each spraying operation, the distribution system is substantially emptied of insecticide and each subsequent spraying operation means that the conduits forming the system must be refilled before the actual spraying through the nozzles is accomplished. This means that air can enter the system following each spraying operation which must be evacuated further interfering with the efficiency of the spraying operation.

Another limitation of such prior art spray systems is presented when the pressurized fluid is to be conducted to nozzles located at a substantial elevation from the supply aerosol container. As can be understood, the flow of pressurized fluid upward to an elevated location is accompanied by a loss of pressure in the fluid impairing the efficiency of the spraying operation. For instance, it has been found that in one installation, a pressure drop in the pressurized fluid of approximately ¾ psi per foot of length of vertical conduit is not uncommon.

SUMMARY OF THE INVENTION

In general, the objects of this invention and other related objects are accomplished by providing a main conduit and at least one branch conduit connected at one end to the main conduit and having a closed other end with at least one normally closed spray nozzle connected to the branch conduit. An aerosol container containing a first pressurized fluid is provided with an outlet which is connected to the main conduit to fill the main conduit and branch conduit with the first pressurized fluid so that the pressurized fluid in the conduits is maintained under equilibrium conditions with the first pressurized fluid in the container. Means are provided for opening the nozzle to spray an area adjacent thereto and condition responsive means such as timing means are operatively associated with the nozzle opening means for periodically opening the nozzle for a selected timed interval to spray a specific quantity of the first pressurized fluid within the adjacent area. A supplementary source of a second pressurized fluid is connected by conduit means to the aerosol container through a pressure regulator for introduction of the second pressurized fluid into the aerosol container to compensate for pressure loss in the first pressurized fluid in the conduits.

Accordingly, a primary object of this invention is to provide a new and novel spray system utilizing an aerosol container which permits the system to be completely filled with a pressurized fluid so as to maintain the system under equilibrium aerosol conditions during periodic spraying operations.

Still another object of this invention is to provide a new and novel spray system having nozzles for spraying a pressurized fluid at a predetermined pressure regardless of the height at which the nozzles are positioned.

A still further object of this invention is to provide a new and novel insecticide spray system in which an aerosol type insecticide-gaseous propellant mixture is maintained throughout the system under equilibrium pressurized conditions so that the insecticide is efficiently and uniformly sprayed in precisely controlled amounts through the nozzles during each spraying operation.

This invention further contemplates the provision of a new and novel insecticide spray system which is capable of prolonged operation without replenishment while dispensing through nozzles specific dosages of insecticide in selected areas automatically, which permits easy evacuation of entrapped air in the system prior to each replenishment operation and which permits various portions of the system to be disconnected for spraying selected areas only.

Still another object of this invention is to provide a new and novel spray system utilizing an aerosol container and a plurality of conduits having nozzles for spraying areas of any selected breadth with a pressurized fluid of any of a wide variety of compositions such as fire retardant material, sanatizing fluid, an insecticide or the like.

DESCRIPTION OF THE DRAWING

FIG. 1 is a diagrammatic representation of the fluid distribution system of the invention;

FIG. 2 is an enlarged view of a portion of the system of FIG. 1; and

FIG. 3 is an enlarged view of another portion of the system of FIG. 1.

PREFERRED EMBODIMENT OF THE INVENTION

Referring now to the drawing and to FIG. 1 in particular, there is shown a spray system constructed in accordance with the invention which, as will be explained hereinafter, is utilized to spray areas which may be open or within enclosures or both. It should be understood that although the description to follow will be directed to the use of the system for the spraying of insecticide, the system is readily adaptable for use in the spraying of any selected pressurized fluid such as a fire retardant fluid, namely Freon, or the like, a sanatizing fluid, etc. The use of the system for the spraying of an insecticide is in those areas where infestation and contamination by insects and the like is to be eliminated.

The system of FIG. 1 includes a header or main conduit 11 formed of copper tubing or the like which may be of any selected length in accordance with the extent of the area to be sprayed. As can be understood, one end 11a of the main conduit is arranged to be detachably connected by means such as an adapter 12 to the outlet 13a of a container and, in particular, an aerosol cylinder 13 containing a first pressurized fluid such as a selected mixture of an insecticide and a gaseous propellant in the well known manner. The other end 11b of the main conduit 11 is arranged to be suitably closed by means of a fitting or the like.

At least one branch conduit 14, which may be similarly constructed of copper tubing or the like, is arranged to be connected at one end 14a to the main conduit 11 in communication therewith, two of such conduits 14, 14' being shown in FIG. 1 and having like numerals to identify like parts. As shown, the branch conduits 14, 14' have ends 14a and 14a' connected to the main conduit 11 in spaced relationship.

It should be understood that as many branch conduits as desired may be utilized depending on the extent of the area to be sprayed and the areas to be sprayed may be either open spaces or areas within enclosures such as enclosures 16, 16' shown in broken lines in FIG. 1 in association with the branch conduits 14, 14' respectively. The other ends 14b, 14b' of the conduits 14, 14' respectively are closed preferably by means of manually operated valves 17, 17' respectively. The valves 17, 17' are bleed valves for a purpose to be explained hereinafter and are normally maintained in the closed condition.

At least one normally closed, spray nozzle is positioned on each of the branch conduits and preferably a plurality of normally closed nozzles 18, 18' are provided on the branch conduits 14, 14' respectively in spaced relationship in accordance with the extent of the area to be sprayed. It should be understood that the nozzles 18, 18' are similar in construction and that the description to follow will be directed to one of such nozzles.

Means are provided for opening the normally closed nozzles 18, 18' for spraying an area adjacent the nozzles and, in the preferred embodiment, the nozzles 18, 18' are solenoid valve operated each being provided with such a valve 21, 21' as shown best in FIG. 2. The solenoid valves 21, 21' are of conventional construction and, in the deenergized condition of the solenoid, normally interrupt the communication between the branch conduits 14, 14' and the nozzles 18, 18'. Condition responsive means are provided for actuating the nozzle opening means or valves 21, 21' for spraying the areas adjacent the nozzles 18, 18' and, in the specific embodiment, circuit means are provided which include main conductors 22 and branch conductors 23 for connecting the solenoids in each of the valves 21, 21' to an associated source of electrical power 24 (not shown).

As shown in FIG. 1, the main conductors 22 are provided with suitable junction boxes 26 by means of which the main conductors 22 are connected to each of the branch conductors 23, 23' which are connected to all of the solenoids in the valves of the nozzles connected to the branch conduits with which the respective branch conductors 23, 23' are associated. As shown in FIG. 2, the connection between the branch conductors 23, 23' and the valve solenoids 21, 21' is facilitated by the provision of junction boxes 28, 28' respectively.

In one embodiment, the condition responsive means preferably include timing means operatively associated with the nozzle opening means or solenoid actuated valves 21, 21' for periodically opening the nozzles 18, 18' for a selected timed interval to spray a specific quantity of the first pressurized fluid or dosage of insecticide within the adjacent areas. More specifically, a timer 31 of conventional construction is connected within the circuit means and, in the illustrated embodiment, between the main conductors 22 and the associated source of electrical power 24. As can be understood, the setting on the timer 31 determines when and for how long current will flow from the power source 24 to the solenoids of the valves 21, 21'. Thus, with actuation of the solenoids of the valves 21, 21', the nozzles 18, 18' are actuated for a spraying operation for a selected timed interval in accordance with the precise amount of insecticide to be sprayed.

Preferably, a switch 32 is included in the circuit means for connecting the entire system to the associated source of electrical power 24 thereby bypassing the timer 31 and permitting the system to be manually operated. Where the system is adapted to spray a fire retardant or fire extinguishing fluid supplied by the container 13, condition responsive devices such as thermal relays T, T' are preferably provided within the enclosures 16, 16' respectively. The thermal relays T, T' may be connected by means of secondary branch conductors 38, 38', junction boxes 39, 39' and secondary main conductors 40 to switch 32. Thus the thermal relays T, T', when actuated and similarly to the manual switch 32, connect the entire system to the associated source of electrical power 24 and bypass the timer 31.

The main conduit 11 is also provided with a check valve 33 by means of which one-way flow only of the first pressurized fluid from the container 13 to the branch circuits 14, 14' is obtained. Also, an on-off valve 34 is provided in the main conduit 11 adjacent the end 11a for closing the main conduit 11 to permit connection of a full container 13 when replenishment is to be accomplished.

In an installation of the spray system of the invention wherein the main conduit and/or branch conduits 14, 14' extend upwardly to such heights so as to position the nozzles 18, 18' at a substantial elevation, there is an attendant drop in pressure in the first pressurized fluid in the conduits. Accordingly, a supplementary source of a second pressurized fluid is included in the system of FIG. 1 to compensate for such a pressure loss. In the embodiment of FIG. 1, such supplementary source is a container 41 having an outlet 41a which contains a second pressurized fluid such as $CO_2$.

Conduit means are provided for communicating the supplementary source or container 41 with the interior of the aerosol container 13. More specifically, the conduit means include a conduit 42 having one end 42a suitably connected to the container outlet 41a. The conduit 42 preferably extends through the aerosol container upper wall 13b with its other end 42b disposed above the level 44a of the first pressurized fluid or insecticide-gasious propellant mixture 44.

In the preferred embodiment, the second pressurized fluid in the container 41 is $CO_2$ and as the pressure of the $CO_2$ in the container 41 may be as high as approximately 6000 psi, a pressure regulator 46 is provided in the conduit 42. As the pressure of the second pressurized fluid or insecticide-gaseous propellant mixture 44 in the aerosol container is generally approximately 90 psi, the regulator 46 is arranged to introduce $CO_2$ into the interior of the aerosol container 13 at a pressure of approximately 100 psi.

OPERATION OF THE INVENTION

When the system of FIG. 1 is to be prepared for operation, and with the valve 34 in the closed position, a connection is made between the outlet 13a of a full container 13 and the adapter 12 on the main conduit 11. The bleed valves 17, 17' as well as valve 34 are opened so that pressurized fluid such as the insecticide-gaseous propellant mixture flows from the container 13 through the main conduit 11 and into the branch conduits 14, 14' toward the branch conduit ends 14b, 14b' respectively. With the bleed valves in the open position, air which may be entrapped within the branch conduits is therefore forced out and as soon as escaping fluid is detected, the valves 17, 17' are closed.

As the pressurized fluid or insecticide-gaseous propellant mixture 44 flows out of the container 13 into the main conduit 11 and subsequently into the branch conduits 14, 14', all of the conduits are filled with the mixture and the mixture in the conduits is maintained under equilibrium conditions with the mixture in the container 13. Thus, the entire system constitutes an aerosol-type container ready for operation. Under the control of the timer 31, all of the solenoids in the valves 21, 21' are simultaneously energized to simultaneously open all of the valves with spraying simultaneously for the timed interval through all of the nozzles 18, 18'.

The circuit means incorporated in the system of the invention also preferably includes switch means such as a switch 36 in branch circuit 23, switch 36' being provided for branch circuit 23'. A valve 37 is also provided in the branch conduit 14, valve 37' being provided in branch conduit 14' for interrupting the flow of the mixture into the conduits 14, 14' respectively. Therefore, in the event that spraying in one or more selected areas is not desired, for instance, in enclosure 16, switch 36 and valve 37 are moved to the off or closed positions for disconnecting conductors 23 and conduit 14 from the power source 24 and the main conduit 11 respectively thereby eliminating that branch circuit from the spraying operation while the spraying operation is carried out in the other branch conduits.

In those installations wherein the conduits 11, 14, 14' extend to elevated levels thereby positioning the nozzles 18, 18' at such heights that a pressure drop incurs in the first pressurized fluid or mixture 44, the regulator 46 is opened to admit the second pressurized fluid or $CO_2$ into the aerosol container 13. Thus, the $CO_2$ applies an augmenting pressure to the mixture 44 at its surface 44a so that the mixture is sprayed from the nozzles 18, 18' at the proper pressure.

Having thus described the invention, what is claimed is:

1. A distribution system for a combination of liquid and gas comprising:
   a. a main conduit through which said combination may flow;
   b. a plurality of branch conduits through which said combination may flow connected to said main conduit at one end and closed at the other end;
   c. a plurality of spray nozzles connected on each of said plurality of branch conduits;
   d. a plurality of valve means, one on each of said plurality of spray nozzles, operable to control flow of said combination through each of said plurality of spray nozzles;
   e. flow control means for introducing said combination of a liquid and a gas into said main conduit and thereby to said plurality of branch conduits including a supply source, and for maintaining said combination of a liquid and gas in similar proportions in said main conduit and said plurality of branch conduits as it is in said supply source; and f. a booster source operative to compensate for pressure loss of said combination of liquid and gas throughout said distribution system.

2. A distribution system according to claim 1 further comprising a pressure regulator located between said supply source and said booster source and operative to maintain a pre-determined pressure in said distribution system.

3. A distribution system according to claim 1 wherein said flow control means further comprises a check valve on said main conduit located near said supply source whereby flow of said liquid back into said supply source is prevented.

4. A distribution system according to claim 1 wherein said plurality of branch conduits are closed at said other end by a normally closed valve which is operable to be opened when said combination of a liquid and a gas is introduced into said main conduit and said plurality of branch conduits by said flow control means whereby any air or vapor trapped within said main conduit or said plurality of branch conduits may be expelled therefrom, thereby permitting a similar proportion of said combination of liquid and gas to be established throughout said distribution system.

5. A distribution system according to claim 1 further comprising a timing means controlling said plurality of valve means and thereby controlling flow of said combination of liquid and gas through each of said plurality of spray nozzles.

6. A distribution system according to claim 3 wherein said plurality of branch conduits are closed at said other end by a normally closed valve which is operable to be opened when said combination of a liquid and a gas is introduced into said main conduit and said plurality of branch conduits by said flow control means whereby any air or vapor trapped within said main conduit or said plurality of branch conduits may be expelled therefrom, thereby permitting a similar proportion of said combination of a liquid and a gas to be established throughout said distribution system.

7. A distribution system according to claim 5 wherein said flow control means further comprises a check valve on said main conduit located near said supply source whereby flow of said liquid back into said supply source is prevented.

8. A distribution system according to claim 7 wherein said plurality of branch conduits are closed at said other end by a normally closed valve which is operable to be opened when said combination of a liquid and a gas is introduced into said main conduit and said plurality of branch conduits by said flow control means whereby any air or vapor trapped within said main conduit or said plurality of branch conduits may be expelled therefrom, thereby permitting a similar proportion of said combination of a liquid and a gas to be established throughout said distribution system.

9. A distribution system according to claim 1 wherein said flow control means further comprises a plurality of trap means located in the interior of said plurality of branch conduits and operative to prevent the flow-back of said mixture of liquid and gas.

10. A distribution system according to claim 8 wherein said plurality of valve means comprises a plurality of solenoid actuated valves, a plurality of circuit means for connecting said plurality of solenoid actuated valves to a source of electrical power, and wherein said timing means is located in said plurality of circuit means for periodically energizing said plurality of solenoid actuated valves in order to allow flow of said combination of liquid and gas to said plurality of nozzles.

11. A distribution system according to claim 10 wherein said plurality of circuit means includes a plurality of switches operatively associated with all of the plurality of solenoid actuated valves in each of said plurality of branch conduits for disconnecting the plurality of solenoid actuated valves in a selected branch conduit from said source of electrical power and a valve in each of said plurality of branch conduits for interrupting the flow of said combination of liquid and gas between a selected branch conduit and said main conduit.

* * * * *